(12) United States Patent
Buchanan

(10) Patent No.: US 11,808,352 B2
(45) Date of Patent: Nov. 7, 2023

(54) IDLER SPROCKET SHAFT SUPPORT DEVICE

(71) Applicant: Larry R. Buchanan, Cle Elum, WA (US)

(72) Inventor: Larry R. Buchanan, Cle Elum, WA (US)

( * ) Notice: Subject to any disclaimer, the term of this patent is extended or adjusted under 35 U.S.C. 154(b) by 0 days.

(21) Appl. No.: 17/941,434

(22) Filed: Sep. 9, 2022

(65) Prior Publication Data

US 2023/0073088 A1     Mar. 9, 2023

Related U.S. Application Data

(60) Provisional application No. 63/242,480, filed on Sep. 9, 2021.

(51) Int. Cl.
*F16H 7/12*        (2006.01)
*F16H 7/08*        (2006.01)

(52) U.S. Cl.
CPC ..... *F16H 7/1263* (2013.01); *F16H 2007/088* (2013.01); *F16H 2007/0842* (2013.01); *F16H 2007/0891* (2013.01)

(58) Field of Classification Search
CPC ........... F16H 2007/0891; F16H 7/1263; F16H 2007/088; F16H 7/08
USPC ........................................................ 474/136
See application file for complete search history.

(56) References Cited

U.S. PATENT DOCUMENTS

| | | | | |
|---|---|---|---|---|
| 85,012 A | * | 12/1868 | King | F16H 7/08 474/136 |
| 139,228 A | * | 5/1873 | Arnold | F16K 31/05 160/322 |
| 516,927 A | * | 3/1894 | Hanson | 16/210 |
| 771,233 A | * | 10/1904 | Davidson | 474/136 |
| 776,170 A | * | 11/1904 | Burkhardt | 474/136 |
| 833,668 A | * | 10/1906 | Bouvier et al. | D01H 1/365 474/136 |
| 1,370,749 A | * | 3/1921 | Kimble | F16H 7/08 474/70 |
| 1,503,500 A | * | 8/1924 | Heintz | E05F 11/486 49/352 |
| 2,121,080 A | * | 6/1938 | Galkin | D05B 69/30 474/146 |
| 2,765,821 A | * | 10/1956 | Strunk | B27B 17/14 30/386 |
| 2,985,027 A | * | 5/1961 | Murray | F16H 7/1263 474/138 |

(Continued)

OTHER PUBLICATIONS

"DMR Chain Tugs Chain Tensioner, 10mm Pair," Walmart.com. https://www.walmart.com/ip/DMR-Chain-Tugs-Chain-Tensioner-10mm-Pair/165600808 [Date accessed: May 4, 2021].

*Primary Examiner* — Henry Y Liu
(74) *Attorney, Agent, or Firm* — Bold IP, PLLC

(57) ABSTRACT

An idler sprocket shaft support device for use with chain-driven equipment (e.g., snowblowers) is provided. The support device includes a spacer through which the sprocket shaft passes through, and an elongate support member coupled to the spacer and extending through an aperture in an adjacent support plate. By locking the elongate support member within the aperture in the adjacent support plate at a particular distance, the spacer also is locked thereby holding the sprocket shaft at a desired positional setting.

20 Claims, 5 Drawing Sheets

(56) References Cited

U.S. PATENT DOCUMENTS

| | | | | |
|---|---|---|---|---|
| 3,422,692 A * | 1/1969 | Woodring | F16H 7/1263 | 474/136 |
| 4,086,821 A * | 5/1978 | Saxon | F16H 7/06 | 474/84 |
| 4,411,638 A * | 10/1983 | Wilson | F16H 7/1236 | 474/138 |
| 4,509,934 A * | 4/1985 | Balius | F16H 7/1263 | 474/136 |
| 4,540,387 A * | 9/1985 | Epino | F16H 7/14 | 474/136 |
| 4,838,101 A * | 6/1989 | Dobberpuhl | B60K 25/02 | 474/136 |
| 5,046,676 A * | 9/1991 | McClintock | F16H 7/1263 | 242/541.3 |
| 5,244,439 A * | 9/1993 | Rogus | F16H 7/1263 | 474/190 |
| 5,528,835 A * | 6/1996 | Ra | B27B 17/14 | 30/386 |
| 5,546,665 A * | 8/1996 | Jackmauh | B62M 9/16 | 180/231 |
| 5,881,823 A * | 3/1999 | Kabatnik | B25D 17/00 | 173/217 |
| 6,086,036 A * | 7/2000 | Santa Cruz | F16H 7/1263 | 474/136 |
| 7,052,422 B2 * | 5/2006 | Skidmore | F16H 7/14 | 474/136 |
| 10,981,625 B2 * | 4/2021 | Brown | B62M 1/36 | |
| 11,536,350 B1 * | 12/2022 | Long | F16H 7/1209 | |
| 2002/0039943 A1 * | 4/2002 | Serkh | F16H 7/1263 | 474/134 |
| 2003/0176250 A1 * | 9/2003 | Austin | F02B 67/06 | 474/134 |
| 2005/0026731 A1 * | 2/2005 | Skidmore | B62M 9/16 | 474/136 |
| 2005/0079939 A1 * | 4/2005 | Simmons | F16H 7/14 | 474/101 |
| 2005/0176538 A1 * | 8/2005 | Morita | B62M 9/16 | 474/136 |
| 2006/0217223 A1 * | 9/2006 | Schmid | F16H 7/1281 | 474/136 |
| 2008/0132365 A1 * | 6/2008 | Boussaguet | F16C 33/723 | 474/136 |
| 2009/0005203 A1 * | 1/2009 | Nowakowski | B65G 23/44 | 474/136 |
| 2012/0142468 A1 * | 6/2012 | Lescorail | F16C 35/067 | 384/477 |
| 2014/0057747 A1 * | 2/2014 | Hood | F16H 7/1263 | 474/113 |
| 2016/0040759 A1 * | 2/2016 | Gergis | F16H 7/1281 | 474/101 |
| 2019/0217149 A1 * | 7/2019 | Wang | A63B 21/4015 | |

\* cited by examiner

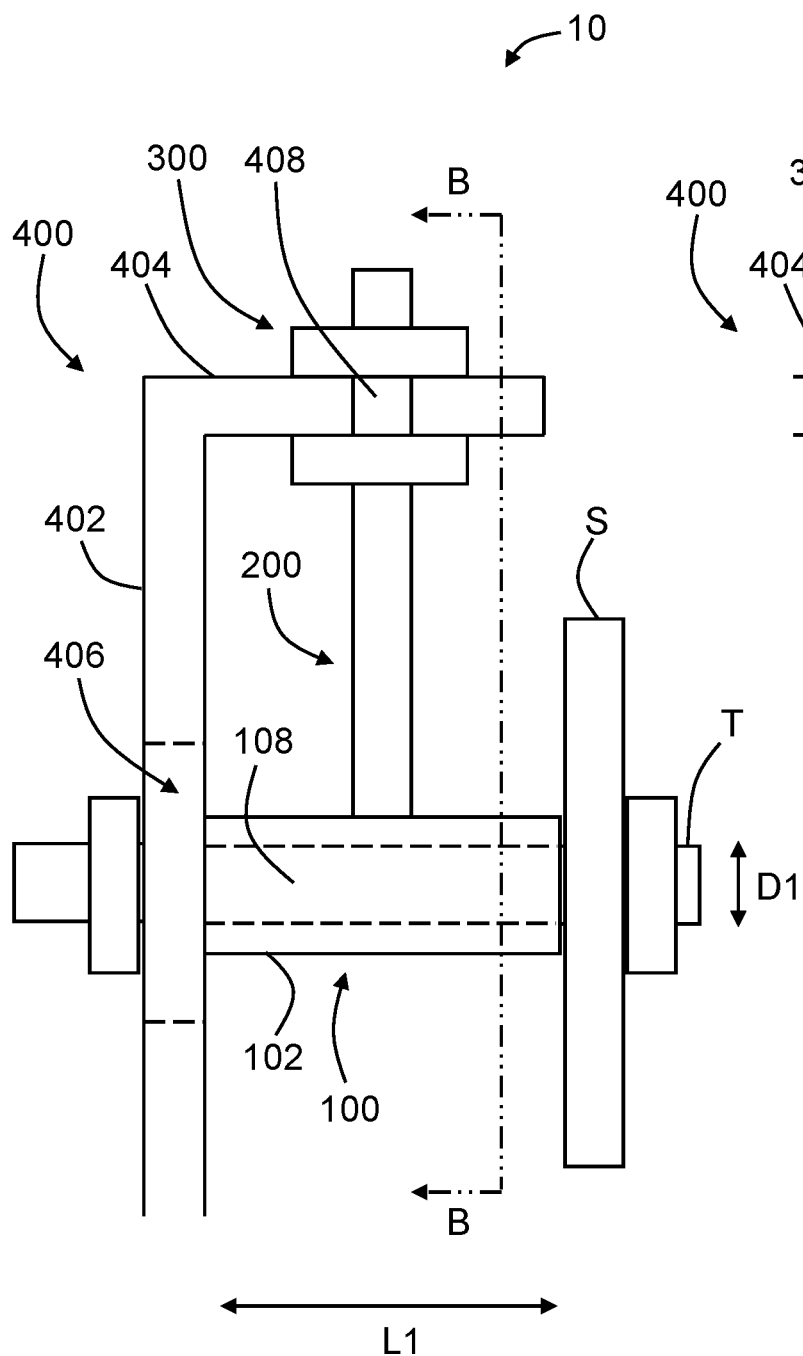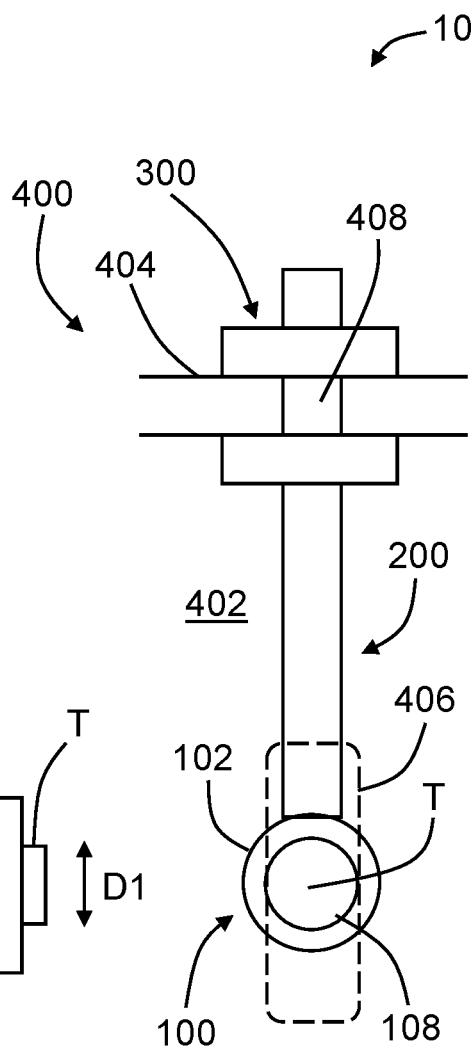

FIG. 4A
FIG. 4B
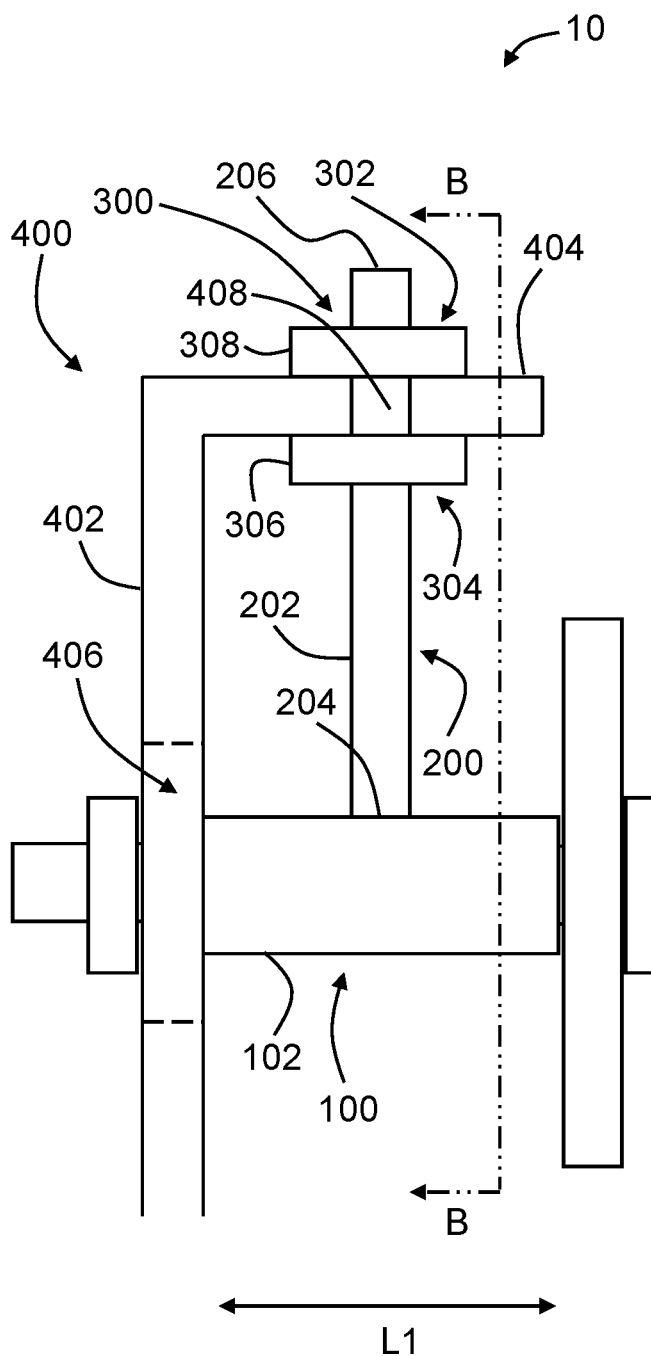
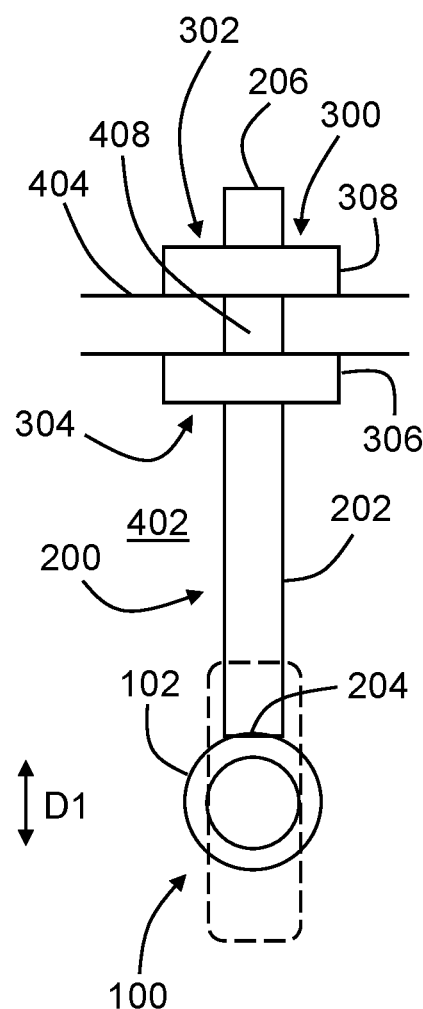

FIG. 5A
FIG. 5B
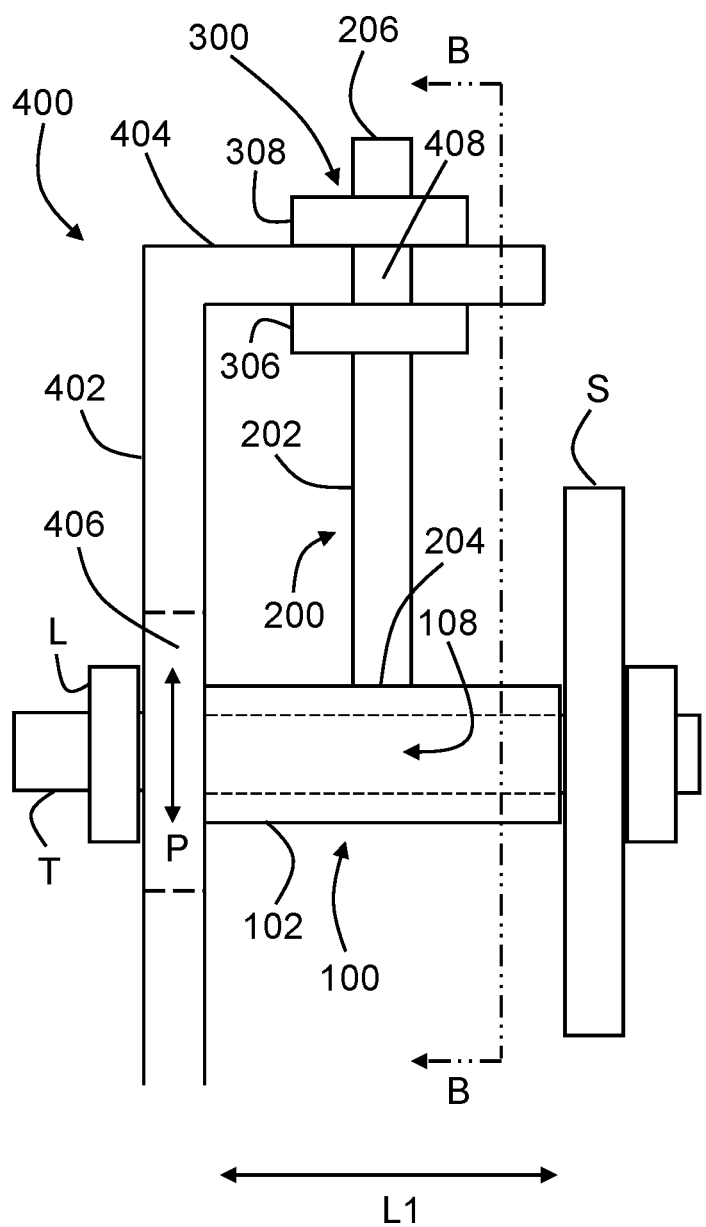
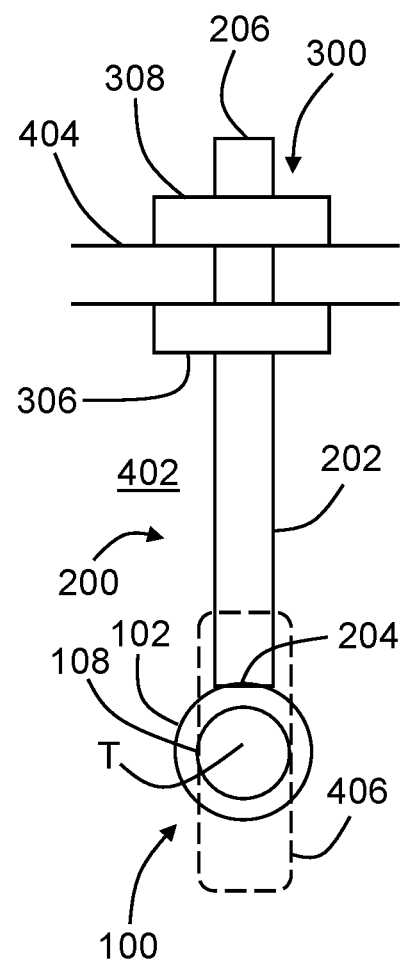

IDLER SPROCKET SHAFT SUPPORT DEVICE

CROSS-REFERENCE TO RELATED APPLICATIONS

This application claims priority to U.S. Provisional Application No. 63/242,480 filed Sep. 9, 2021, the entire contents of which are hereby fully incorporated herein by reference for all purposes.

FIELD OF THE INVENTION

This invention relates to sprocket shaft support devices, including an idler sprocket shaft support device for chain-driven snow blowers.

BACKGROUND

Chain-driven equipment such as snow blowers and other types of equipment often include chain tensioning devices to keep the drive chain at the proper tension for use. Such chain tensioning devices, also referred to as idler sprockets, typically include a non-driving sprocket configured with a sprocket shaft via a sealed bearing that allows the sprocket to spin freely. The idler sprocket is engaged with the chain and adjustable to press upon (and consequently deflect) the chain in order to set the proper chain tension.

In many cases, the tension of the drive chain is set by adjusting the position of the idler sprocket within a slot relative to the chain until the desired chain tension is achieved. Once set, the idler sprocket's shaft is locked within the slot using locking bolts.

However, during operation of the chain-driven equipment, forces are applied by the drive chain to the sprocket and the sprocket's shaft, thereby shifting the position of the shaft within the locking slot and causing the chain tension to become out of alignment.

Accordingly, there is a need for an idler sprocket support device that locks the idler sprocket in place even when external forces are applied. The presently disclosed system addresses these needs.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 2A shows aspects of a sprocket shaft support device according to exemplary embodiments hereof;

FIG. 2B shows aspects of a sprocket shaft support device according to exemplary embodiments hereof;

FIG. 4A shows aspects of a spacer support assembly according to exemplary embodiments hereof;

FIG. 4B shows aspects of a spacer support assembly according to exemplary embodiments hereof;

FIG. 5A shows aspects of a sprocket shaft support device according to exemplary embodiments hereof;

FIG. 5B shows aspects of a sprocket shaft support device according to exemplary embodiments hereof.

SUMMARY

Figure 1:
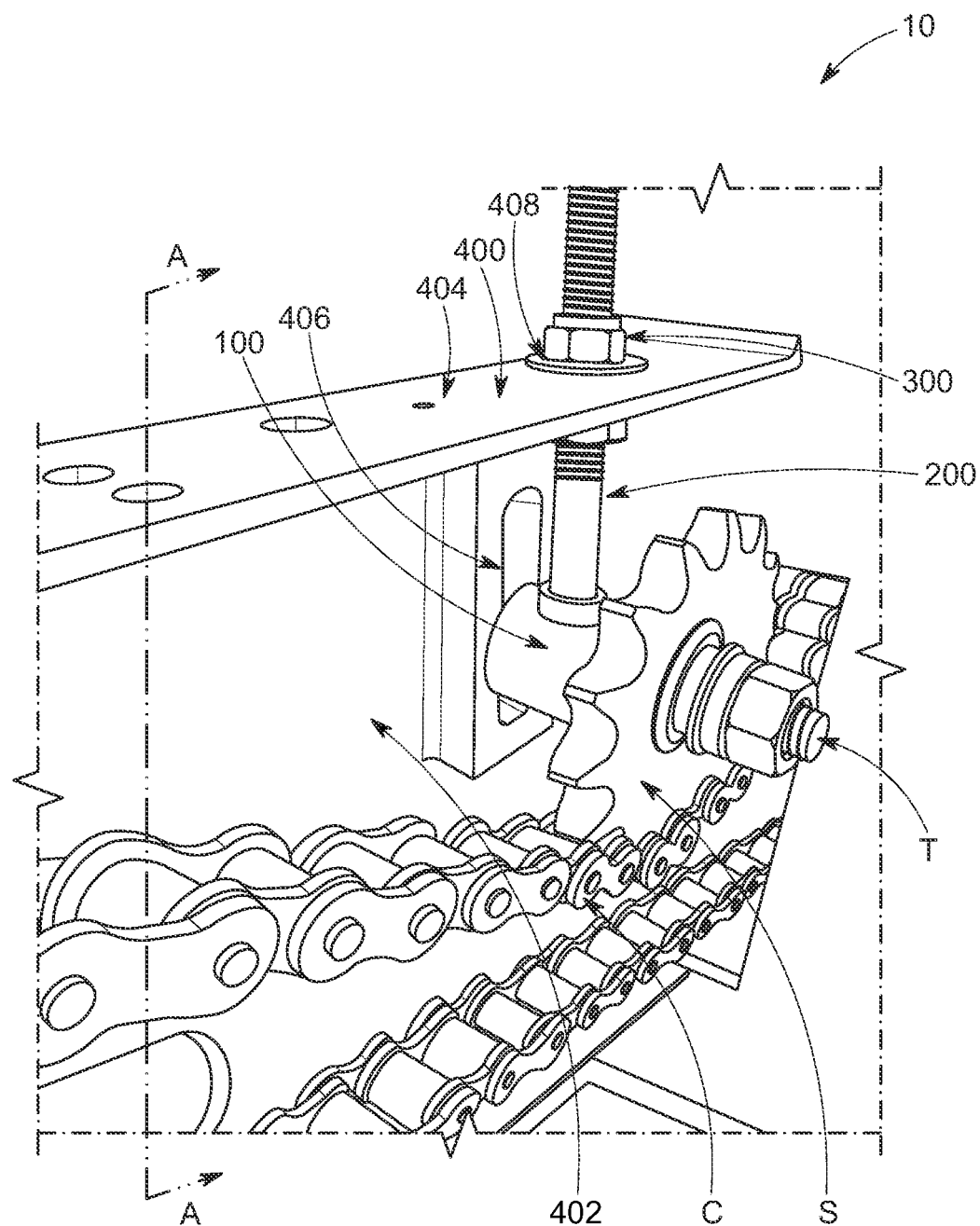
FIG. 1 shows aspects of a sprocket shaft support device according to exemplary embodiments hereof.

According to one aspect, one or more embodiments are provided below for a sprocket shaft support device including a first plate including a first plate surface with a first plate elongate slot, a second plate including a second plate aperture, the second plate at a non-zero angle with respect to the first plate, a spacer including a spacer first end, a spacer second end opposite the spacer first end, and a spacer through hole extending from the spacer first end to the spacer second end, the spacer first end abutted the first plate surface at the first plate elongate slot, a sprocket shaft passing through the spacer through hole and the first plate elongate slot, an elongate support member with a first end coupled to the spacer and a second end extending away from the spacer and through the second plate aperture, and a first locking mechanism configured with the second end of the elongate support member and adapted to lock the second end of the elongate support member within the second plate aperture.

In another embodiment, the sprocket shaft support device includes a second locking mechanism configured with the sprocket shaft and adapted to lock the sprocket shaft within the first plate elongate slot.

In another embodiment, first plate elongate slot includes a length that defines a slot longitudinal axis, and the slot longitudinal axis is parallel to the elongate support member.

In another embodiment, the sprocket shaft support device includes a sprocket rotatably coupled to the sprocket shaft.

In another embodiment, the sprocket is adjacent the spacer opposite the first plate surface.

In another embodiment, the sprocket is abutted the spacer opposite the first plate surface.

In another embodiment, the elongate support member is orthogonal to the sprocket shaft.

In another embodiment, the spacer through hole defines a spacer longitudinal axis, and the elongate support member is orthogonal to the spacer longitudinal axis.

In another embodiment, a width of the first plate elongate slot corresponds to a width of the sprocket shaft, and a height of the elongate slot is greater than the width of the sprocket shaft.

In another embodiment, a position of the sprocket shaft within the first plate elongate slot is adjustable.

In another embodiment, a width of the spacer is greater than a width of the first plate elongate slot.

In another embodiment, the sprocket shaft is orthogonal to the first plate surface.

In another embodiment, the elongate support member is orthogonal to the second plate.

In another embodiment, the first locking mechanism includes one or more bolt nuts.

In another embodiment, the second locking mechanism includes one or more bolt nuts.

In another embodiment, the non-zero angle is about 90°.

According to another aspect, one or more embodiments are provided below for a shaft support device including a first support structure including a first support surface with a first support elongate slot, a second support structure including a second support aperture, the second support structure at a non-zero angle with respect to the first support structure, a spacer including a spacer first end, a spacer second end opposite the spacer first end, and a spacer passageway extending from the spacer first end to the spacer second end, the spacer first end abutted the first support surface at the first support elongate slot, a sprocket shaft passing through the spacer passageway and the first support elongate slot, an elongate support member with a first end coupled to the spacer and a second end extending away from the spacer and through the second support aperture, and a first locking mechanism configured with the second end of the elongate support member and adapted to lock the second end of the elongate support member within the second support aperture.

In another embodiment, the shaft support device includes a second locking mechanism configured with the sprocket shaft and adapted to lock the sprocket shaft within the first support elongate slot.

In another embodiment, the sprocket is abutted the spacer opposite the first support surface.

Other aspects and advantages of the invention will be apparent from the following description and the appended claims.

DETAILED DESCRIPTION OF EXEMPLARY EMBODIMENTS

In general, and according to exemplary embodiments hereof, an idler sprocket shaft support device for use with chain-driven equipment such as snow blowers is provided. As is known in the art, a sprocket is a toothed wheel whose teeth engage the links of a chain, and an idler sprocket is a device used to adjust the tension of a drive chain. An idler sprocket typically includes a non-driving sprocket configured with a sprocket shaft via a sealed bearing that allows the sprocket to spin freely. The idler sprocket is engaged with the chain and is adjustable to press upon (and consequently deflect) the chain in order to set the proper chain tension. As described herein, the idler sprocket shaft support device, according to one or more non-limiting embodiments, is designed to secure and support an idler sprocket shaft, and a sprocket configured with the shaft, at a particular location and setting.

For the purposes of this specification, the sprocket shaft support device 10 will be described predominantly with respect to its use with snow blowers and other types of chain-driven apparatuses. However, it is understood that the device 10 may be used with any types of chain-driven apparatuses, and that the scope of the device 10 is not limited in any way by the type of apparatus that it may be used with.

In some embodiments as shown in FIG. 1, the sprocket shaft support device 10 includes a spacer device 100, a spacer support device 200, and a locking assembly 300. In some embodiments, the sprocket shaft support device 10 also may include a support assembly 400. In general, the spacer device 100 supports a sprocket shaft T and its associated sprocket S. The spacer support device 200 holds the spacer device 100 at a particular location, and the locking assembly 300 locks the spacer support device 200 in place. In this way, the sprocket S engages with the drive chain C to set its desired tension. The sprocket shaft support device 10 also may include other elements and/or components as necessary to perform its functionalities.

Support Assembly 400

For clarity regarding how the sprocket shaft support device 10 may be installed and operated, the support assembly 400 will be described first. In some embodiments, the support assembly 400 may be provided as a part of a complementary apparatus (e.g., as part of chain-driven equipment, such as a snow blower) with which the device 10 may be used. In other embodiments, the support assembly 400, and/or any individual element(s) of the support assembly 400, may be provided as an element of the device 10.

FIG. 2A shows the sprocket shaft support device 10 (including the support assembly 400) taken from the perspective of cutlines A-A as shown in FIG. 1, and FIG. 2B shows the device 10 taken from the perspective of cutlines B-B of FIG. 2A.

As shown in FIG. 2A, the support assembly 400 includes a first plate 402 (e.g., a vertical plate) and a second plate 404 (e.g., a horizontal plate). The first and second plates 402, 404 may preferably be oriented orthogonally with respect to one another and/or connected (e.g., at a corner edge as shown), but this may not be required. For the purposes of this specification, the term "plate" may be interpreted as including other types of support members with sufficient strength and rigidity, such as, bars, beams, rods, other suitable types of support members, and any combinations thereof. In some embodiments, the first and second plates 402, 404 may comprise steel, aluminum, iron, plastic, wood, composite materials, other sufficiently strong and rigid materials, and any combinations thereof.

In some embodiments, the first plate 402 includes a side slot 406 that passes through the plate 402 and that is adapted to receive a portion of the sprocket shaft T therethrough. As shown in FIG. 2A, the sprocket shaft T passes through the side slot 406 with the distal end of the shaft T extending a distance away from the first plate 402 (to the right). In this configuration, the sprocket S is rotatably configured with the distal end of the shaft T (e.g., via bearings) at a distance L1 from the first plate 402. In most applications, it is preferable that the shaft T extend generally perpendicularly from the first plate 402 so that the sprocket S is positioned generally parallel to the first plate 402 as shown, but this may not be required.

In some embodiments as shown in FIGS. 2A and 2B, the side slot 406 includes a width that generally corresponds to the width of the sprocket shaft T so that the shaft T may pass through the side slot 406, and a height that is greater than the width of the sprocket shaft T so that the vertical position of the shaft T within the slot 406 may be variable. In this way, the vertical placement of the shaft T may be set by choosing its desired vertical position within the slot 406. Once the shaft's T's vertical position is chosen, it may be locked and held in place using the sprocket shaft support device 10 as described in other sections.

In some embodiments as shown in FIGS. 2A and 2B, the second plate 404 includes a top hole 408 that passes through the second plate 404. The top hole 408 receives a portion of the spacer support device 200 and the locking assembly 300 locks the spacer support device 200 therein.

Spacer Device 100

Figure 3A:
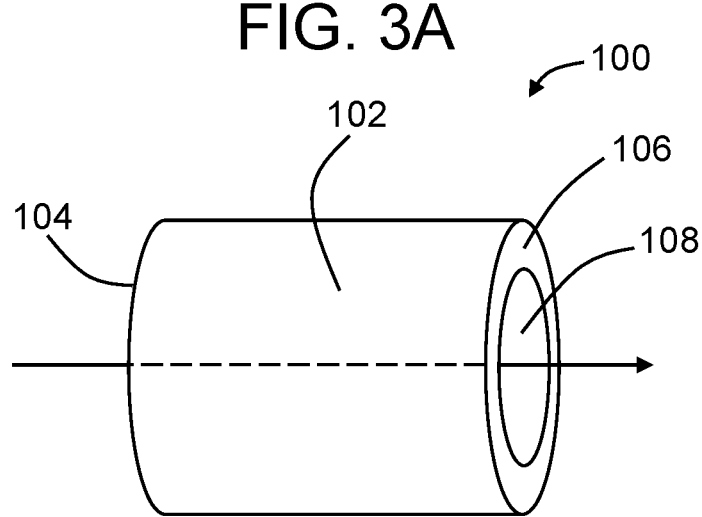
FIG. 3A each show aspects of a spacer according to exemplary embodiments hereof.
Figure 3B:
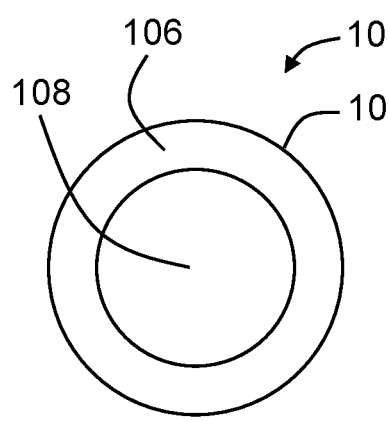
FIG. 3B shows aspects of a spacer according to exemplary embodiments hereof.
Figure 3C:
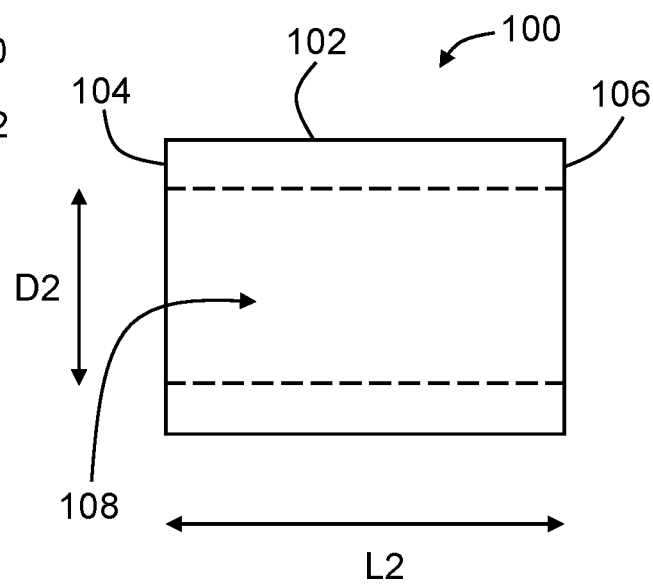
FIG. 3C shows aspects of a spacer according to exemplary embodiments hereof.

In some embodiments as shown in FIGS. 3A-3C, the spacer device 100 includes a spacer body 102 with a first end 104, a second end 106 opposite the first end 104, and a through hole 108 passing through the body 102 from the first end 104 to the second end 106. In some embodiments, the body 102 may be formed as a tube with a generally circular cross section as shown, however, it is contemplated that the cross-section of the body 102 may include other shapes such as, without limitation, square, pentagonal, hexagonal, heptagonal, octagonal, other types of polygons, other suitable cross-sectional shapes, and any combinations thereof.

The through hole 108 is configured to receive and support a portion of a sprocket shaft T (see FIG. 2A). That is, during use, the sprocket shaft T may be inserted into the through hole 108 and held by the spacer body 102 therein. Accordingly, it may be preferable that the cross-sectional shape of the through hole 108 generally match the cross-sectional shape of the sprocket shaft T. For example, if the sprocket shaft T includes a circular cross section, it may be preferable that the through hole 108 also include a circular cross section. In addition, it also may be preferable that the diameter D2 of the through hole 108 (see FIG. 3C) generally match or be slightly larger than the diameter D1 of the sprocket shaft T (see FIG. 2A). In this way, the sprocket shaft T may be received into the through hole 108 without obstruction.

As shown in FIG. 2A, with the sprocket shaft T passing through the slot 406 in the first plate 402 and extending outward therefrom (to the right), the sprocket S is located at a distance L1 from the first plate 402. The spacer device 100 is configured between the first plate 402 and the sprocket S and is designed to hold the sprocket S at this distance L1. Accordingly, as shown in FIG. 3C, it is preferable that the spacer's 100's length L2 be generally equal to the distance L1 so that the sprocket S is held in the desired placement. This will be described in further detail in other sections.

Spacer Support Device 200

In some embodiments as shown in FIGS. 4A and 4B (which correspond to FIGS. 2A and 2B, respectively) the spacer support device 200 includes an elongate member 202 with a first end 204 and a second end 206. The first end 204 is attached to an upper outside surface of the spacer device's 100's body 102 and the second end 206 is adapted to be received through and held within the top hole 408 of the support assembly's 400's second plate 404.

In some embodiments, the elongate member 202 includes a bolt or similar structure.

In some embodiments, the second end 206 of the elongate member 202 is secured within the second plate's 404's top hole 408 by the locking assembly 300 as will be described in other sections. Accordingly, in some embodiments, the second end 206 includes outer screw threads, detents, notches, through-holes, and/or other elements that may aid in its securement.

Locking Assembly 300

In some embodiments as shown in FIGS. 4A and 4B, the locking assembly 300 includes a first locking member 302 and a second locking member 304. In some embodiments, the first locking member 302 includes a first locking nut 306 (e.g., bolt nut) and the second locking member 304 includes a second locking nut 308 (e.g., bolt nut). As shown in FIGS. 4A and 4B, with the second end 206 of the spacer support device 200 configured through the top hole 408 of the second plate 404, the first locking nut 306 may be configured with the threaded second end 206 of the spacer support device 200 on the underside of the second plate 404, and the second locking nut 308 may be configured with the threaded second end 206 of the spacer support device 200 on the topside of the second plate 404. The first and second locking nuts 306, 308 may then be tightened to effectively lock the spacer support device 200 to the second plate 404 as desired.

In other embodiments, the first and second locking members 302, 304 may include other types of locking mechanisms such as, without limitation, detents, latches, notches, other types of locking mechanisms, and any combinations thereof.

In Use

FIGS. 5A and 5B (which correspond to FIGS. 2A and 2B) show the sprocket shaft support device 10 configured with the idler sprocket S and its shaft T as described herein. As shown by the arrow P in FIG. 5A, the vertical position of the sprocket shaft T is adjustable within the slot 406 of the first plate 402. In addition, a locking bolt L is configured with the idler sprocket shaft T at the side of the plate 402 opposite the spacer device 100 that may be used to lock the shaft T within the slot 406 once positioned.

The elongate member 202 of the spacer support device 200 extends upward and through the top hole 408 in the second plate 404. As described in other sections, the elongate member 202 may be locked within the top hole 408 using the locking assembly 300 (e.g., locking nuts 306, 308).

Once configured as described above, the vertical position P of the sprocket shaft T is chosen to set the position of the idler sprocket S relative to a drive chain to achieve the desired drive chain tension. Once this is set, the sprocket shaft T may be locked in place within the slot 406 using the locking bolt L. In this configuration, the spacer 100 holds the idler sprocket S at the distance L1 from the first plate 402 with the sprocket S free to spin. In addition, the second end 206 of the spacer support device 200 is locked in place within the top hole 408 of the second plate 404.

In this configuration, with the sprocket shaft T locked within the slot 406 of the first plate 402, and the second end 206 of the spacer support device 200 locked within the top hole 408 of the second plate 404, the sprocket shaft support device 10 holds the idler sprocket S in place horizontally and vertically even when forces are applied to the sprocket S by the drive chain.

It is understood that any aspect and/or element of any embodiment of the device 10 described herein or otherwise may be combined with any aspect and/or element of any other embodiment of the device 10 in any way to form additional embodiments of the device 10 all of which are within the scope of the device 10.

Where a process is described herein, those of ordinary skill in the art will appreciate that the process may operate without any user intervention. In another embodiment, the process includes some human intervention (e.g., a step is performed by or with the assistance of a human).

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

As used in this description, the term "portion" means some or all. So, for example, "A portion of X" may include some of "X" or all of "X". In the context of a conversation, the term "portion" means some or all of the conversation.

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first," "second," and so on, in the description and claims, are used to distinguish or identify, and not to show a serial or numerical limitation. Similarly, letter labels (e.g., "(A)", "(B)", "(C)", and so on, or "(a)", "(b)", and so on) and/or numbers (e.g., "(i)", "(ii)", and so on) are used to assist in readability and to help distinguish and/or identify, and are not intended to be otherwise limiting or to impose or imply any serial or numerical limitations or orderings. Similarly, words such as "particular," "specific," "certain," and "given," in the description and claims, if used, are to distinguish or identify, and are not intended to be otherwise limiting.

As used herein, including in the claims, the terms "multiple" and "plurality" mean "two or more," and include the case of "two." Thus, e.g., the phrase "multiple ABCs," means "two or more ABCs," and includes "two ABCs." Similarly, e.g., the phrase "multiple PQRs," means "two or more PQRs," and includes "two PQRs."

The present invention also covers the exact terms, features, values and ranges, etc. in case these terms, features, values and ranges etc. are used in conjunction with terms such as about, around, generally, substantially, essentially, at least etc. (i.e., "about 3" or "approximately 3" shall also cover exactly 3 or "substantially constant" shall also cover exactly constant).

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components unless specifically so stated.

It will be appreciated that variations to the embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

The present invention also covers the exact terms, features, values and ranges, etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

Use of exemplary language, such as "for instance", "such as", "for example" ("e.g.,") and the like, is merely intended to better illustrate the invention and does not indicate a limitation on the scope of the invention unless specifically so claimed.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

What is claimed is:

1. A sprocket shaft support device comprising:
    a first plate including a first plate surface with a first plate elongate slot;
    a second plate including a second plate aperture, the second plate at a non-zero angle with respect to the first plate;
    a spacer including a spacer first end, a spacer second end opposite the spacer first end, and a spacer through hole extending from the spacer first end to the spacer second end, the spacer first end abutted the first plate surface at the first plate elongate slot;
    a sprocket shaft passing through the spacer through hole and the first plate elongate slot;
    an elongate support member with a first end coupled to the spacer and a second end extending away from the spacer and through the second plate aperture; and
    a first locking mechanism configured with the second end of the elongate support member and adapted to lock the second end of the elongate support member within the second plate aperture.

2. The sprocket shaft support device of claim 1 further comprising:
    a second locking mechanism configured with the sprocket shaft and adapted to lock the sprocket shaft within the first plate elongate slot.

3. The sprocket shaft support device of claim 1 wherein the first plate elongate slot includes a length that defines a slot longitudinal axis, and the slot longitudinal axis is parallel to the elongate support member.

4. The sprocket shaft support device of claim 1 further comprising:
    a sprocket rotatably coupled to the sprocket shaft.

5. The sprocket shaft support device of claim 4 wherein the sprocket is adjacent the spacer opposite the first plate surface.

6. The sprocket shaft support device of claim 5 wherein the sprocket is abutted the spacer opposite the first plate surface.

7. The sprocket shaft support device of claim 1 wherein the elongate support member is orthogonal to the sprocket shaft.

8. The sprocket shaft support device of claim 1 wherein the spacer through hole defines a spacer longitudinal axis, and the elongate support member is orthogonal to the spacer longitudinal axis.

9. The sprocket shaft support device of claim 1 wherein a width of the first plate elongate slot corresponds to a width of the sprocket shaft, and a height of the elongate slot is greater than the width of the sprocket shaft.

10. The sprocket shaft support device of claim 1 wherein a position of the sprocket shaft within the first plate elongate slot is adjustable.

11. The sprocket shaft support device of claim 1 wherein a width of the spacer is greater than a width of the first plate elongate slot.

12. The sprocket shaft support device of claim 1 wherein the sprocket shaft is orthogonal to the first plate surface.

13. The sprocket shaft support device of claim 1 wherein the elongate support member is orthogonal to the second plate.

14. The sprocket shaft support device of claim 1 wherein the first locking mechanism includes one or more bolt nuts.

15. The sprocket shaft support device of claim 2 wherein the second locking mechanism includes one or more bolt nuts.

16. The device of claim 1 wherein the non-zero angle is about 90°.

17. A sprocket shaft support device comprising:
   a first support structure including a first support surface with a first support elongate slot;
   a second support structure including a second support aperture, the second support structure at a non-zero angle with respect to the first support structure;
   a spacer including a spacer first end, a spacer second end opposite the spacer first end, and a spacer passageway extending from the spacer first end to the spacer second end, the spacer first end abutted the first support surface at the first support elongate slot;
   a sprocket shaft passing through the spacer passageway and the first support elongate slot;
   an elongate support member with a first end coupled to the spacer and a second end extending away from the spacer and through the second support aperture; and
   a first locking mechanism configured with the second end of the elongate support member and adapted to lock the second end of the elongate support member within the second support aperture.

18. The sprocket shaft support device of claim 17 further comprising:
   a second locking mechanism configured with the sprocket shaft and adapted to lock the sprocket shaft within the first support elongate slot.

19. The sprocket shaft support device of claim 17 further comprising:
   a sprocket rotatably coupled to the sprocket shaft.

20. The sprocket shaft support device of claim 19 wherein the sprocket is abutted the spacer opposite the first support surface.

* * * * *